Figure 5:
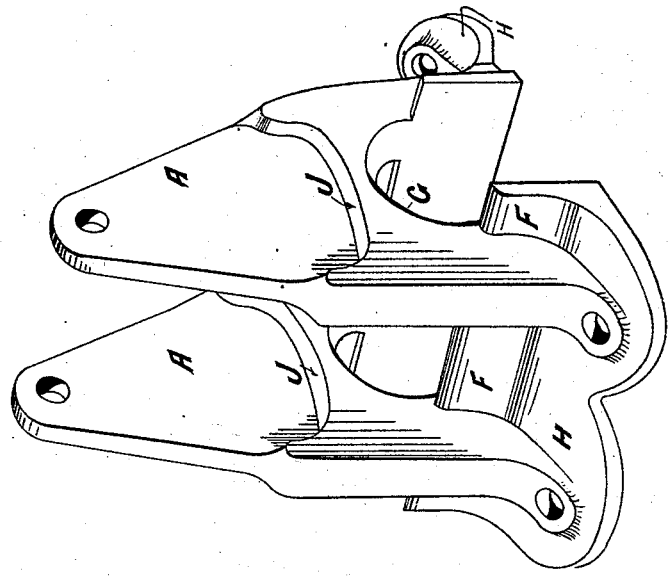

(No Model.) 3 Sheets—Sheet 1.
W. SMITH.
GUIDE BEARING FOR RAILWAY CONNECTION RODS.
No. 572,384. Patented Dec. 1, 1896.
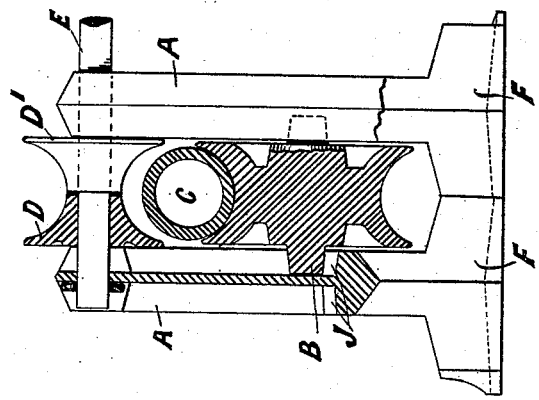
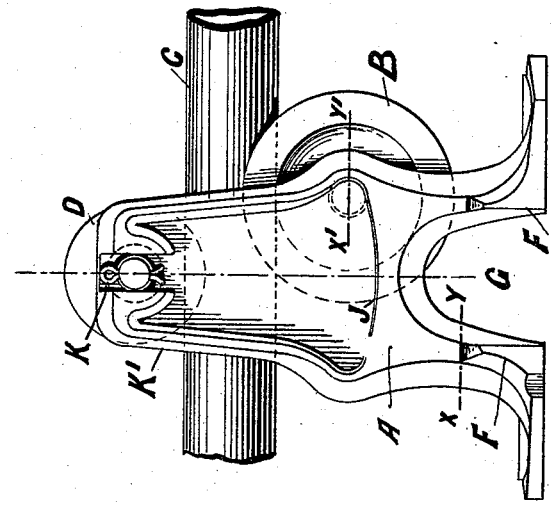
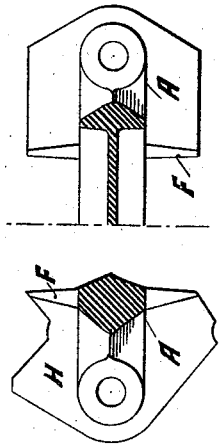
Witnesses
Chas H Smith
J. Staib
Inventor
William Smith
per Lemuel W. Serrell
Atty

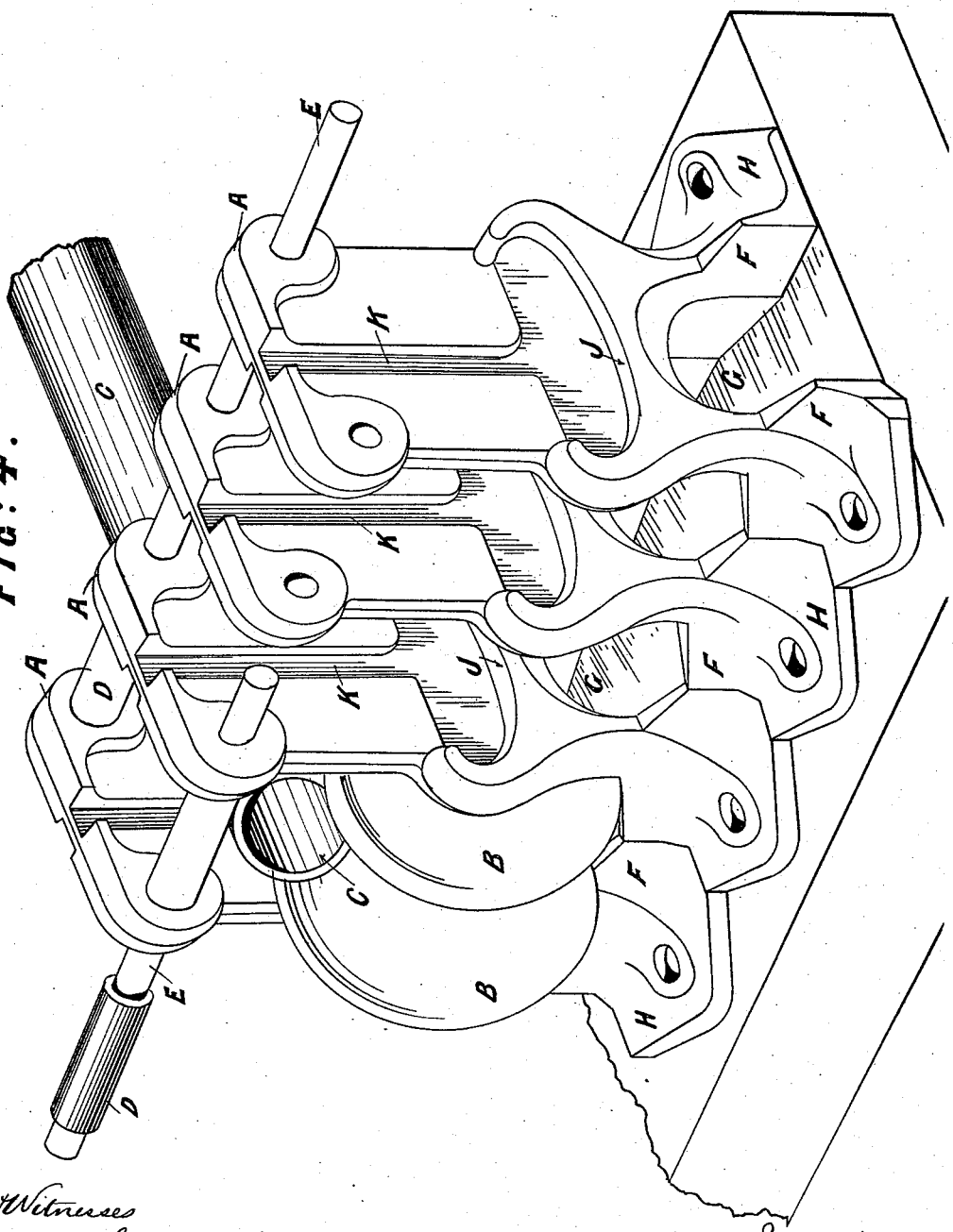

(No Model.) 3 Sheets—Sheet 3.
W. SMITH.
GUIDE BEARING FOR RAILWAY CONNECTION RODS.
No. 572,384. Patented Dec. 1, 1896.

UNITED STATES PATENT OFFICE.

WILLIAM SMITH, OF LONDON, ENGLAND.

GUIDE-BEARING FOR RAILWAY CONNECTION-RODS.

SPECIFICATION forming part of Letters Patent No. 572,384, dated December 1, 1896.

Application filed February 23, 1894. Serial No. 501,137. (No model.) Patented in England December 1, 1892, No. 21,949.

*To all whom it may concern:*

Be it known that I, WILLIAM SMITH, engineer, a subject of the Queen of Great Britain, residing at Brixton, London, in the county of Surrey, England, have invented certain new and useful Improvements in Guide-Bearings for Railway and Similar Connection-Rods, (for which a patent has been granted to me in Great Britain, dated December 1, 1892, No. 21,949,) of which the following is a specification.

My invention refers to improvements in the guide-bearings used on railroads for supporting the actuating connection-rods of switches or points, point-locks, safety-bars, and such like apparatus, and especially in those guide-bearings which are furnished with traveling antifriction-rollers—that is to say, not mere revolving rollers for facilitating the motion of traveling rods, but antifriction-rollers themselves actually traveling in their frames as they revolve for the sake of somewhat more amply facilitating the motion of the traveling rods.

The objects of my invention are to make easier the task of moving such connection-rods, more especially the initial movement, where the inertia of a very heavy mass of rodding may have to be overcome. These objects are effected by improvements extending to a change of construction of the whole framing of such apparatus, including their standards, their pedestals, and their base parts or bed, such changes more or less supporting and aiding each other to increase the efficiency of the antifriction-roller, which latter remains unchanged and is only mounted in a frame differently constructed.

Hitherto in guide-bearing apparatus the bearing and guiding courses or pathways provided for the rollers traveling to and fro with the reciprocating movements of the rods which they support have been absolutely level, whether such courses were "through-slots" in the standards (*e. g.*, "separated" standards) or open ledges (*e. g.*, "combined" standards) or ribs or grooves, as, for example, in encompassing frames or box-like inclosed framing. Now by my invention every such course or pathway is fashioned with gentle downward inclines leading from each end into a common horizontal middle, that is to say, with a central dip or with more or less of a curve, on which account this new kind of pathway may be fitly termed a "switchback" course in contradistinction to a merely horizontal or level course. The rod and its guide-bearing roller in their progress forward or backward will then have a slight compensating or counterbalancing "fall-and-rise" motion, from which a number of advantages arise, helping to make the task of the man operating the lever rather more easy and uniform throughout the stroke because less likely to be extra onerous at the initial movement. Moreover, with the switchback course any traveling roller here or there temporarily left idle (by reason of irregular movement of the rod under the strain of compression) will take up a middle position, which is most advantageous for again traveling with the rod on its return movement when relieved of compression and under the influence of tension. Such fall-and-rise motion of the antifriction traveling roller—that is to say, not a mere revolving roller for facilitating the motion of a traveling rod, but an antifriction-roller itself actually traveling in its frame as it revolves for the sake of somewhat more amply facilitating the motion of a traveling rod— renders it advisable, even more than formerly, that there should be ample clearance and protection underneath against impediment and obstruction. It is advantageous (and economical in weight of metal) to have the central portion of the base of frames open. However, by my invention this mere open-base idea is extended to the provision of a central base-pit or clearance-channel underneath the roller. The central base part of the standards is made arching across the base-plate opening from side to side. When thus made, the base portion of each standard consists of a pair of pedestals with a mid-space as ample and clear as possible. In frames for multiple rodding this clearance-channel is continuous from section to section, and much that would otherwise be obstructive matter may lie harmless therein until raked out. This base-pit or clearance-channel idea also joins excellently well with another feature of novelty in the base, consisting of a fence or guard, either as a boundary-wall on each side to the base-pit or itself making the clearance-channel without any further hollow.

Hitherto the base parts of guide-bearing frames have been merely flat on the top, but according to this part of my invention these fences are wall-like formations on the pedestals, extending from standard to standard and protecting the lower part of the roller on each side. Such drift or casual obstruction as may surmount the fence or wall-like guard on either side will fall into the base-pit or clearance-channel, from which it can be readily removed by reason of the clearance-channel extending crosswise to the path of the rodding.

Hitherto the more ordinary kinds of guide-bearing frames have been one of two classes, namely, either class 1—two or more standards solid on one base, cast vertically with the base uppermost—or class 2—"separated" or half-sectional standards (with double or universal pattern faces) cast horizontally. Each description possesses inherent advantages and disadvantages, but with the latter kind—class 2—as hitherto adapted for trunnioned traveling rollers it has been impracticable to withdraw and replace a trunnioned roller while the standards were fixed in position. It was the through-slot design adapted for the trunnions of the rollers which occasioned the difficulty, since, as may be observed, with the uncovered courses of class 1 above there never was any such difficulty.

Now by my present invention I make the upper portion of standards of the above-mentioned class 2 with a circumferential rim or thick rib connected with a central thin filling or web. This rib is designed to allow, without practical weakness, of a gap for the passage of the roller's trunnions. The thin connecting-web, if continuous throughout, abolishes the older through-slot design. The shelf or ledge constituting my switchback course can be hardly considered in this construction a "covered" course, by reason of the circumferential rib at the crown or summit being a considerable height above the bearing shelf or ledge. This circumferential-rib design is capable of much modification, as will be easily observed from a study of Figures 1 and 4, hereinafter described. To accommodate channel-iron rodding, the middle parts of the circumferential rib flanking the rodding may be flattened and the thickness of the adjacent interior web more or less increased as long as a central pathway is preserved for the roller's trunnions when being withdrawn or inserted. The interior web may be more or less absent at the bottom, and thus the bearing-course may partially resemble a through-slot design.

The improvements above specified all support the efficiency of each other in the various ordinary designs of guide-bearing frames to which they are respectively applicable. However, the inclined or switchback course itself is evidently applicable to other less common or usual forms of guide-bearing apparatus than those furnished with trunnioned rollers, for instance, frames having rollers which may be termed "untrunnioned" rollers, such as spherical rollers or balls and hollow-backed rollers bearing a rod on one side and rolling on the other over guiding-ribs in the base of the frame. In such cases the other explained advantageous modifications of guide-bearing frames will not apparently be applicable.

Standards with a base consisting of two pedestals, and thus having a central opening, have been previously used for separated standards only; but such central opening was not then constructed to furnish a clearance-channel or to lead the way to a base-pit. Moreover, such central opening has not hitherto been flanked by a wall-like pedestal fence, but, on the contrary, has been rather obstructed from furnishing a practicable clearance-channel by reason of strengthening flanges, ribs, or fins projecting into the mid-space.

My invention as above described will be readily understood by reference to the accompanying drawings.

Figure 6:
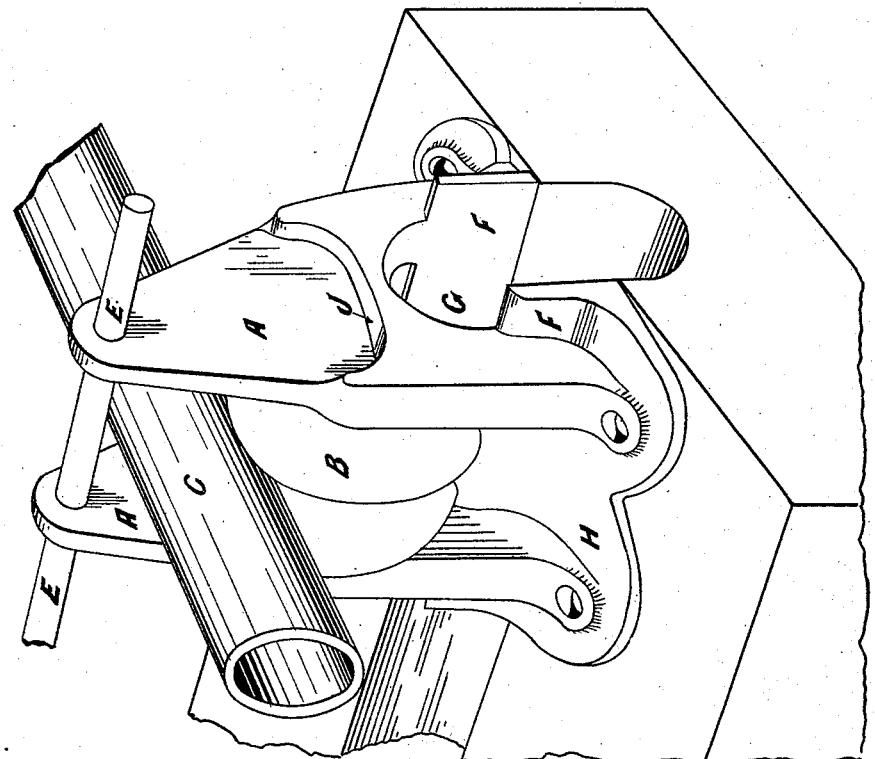

Fig. 1 is a side elevation of a single or separated standard. Fig. 2 is a sectional end elevation of two adjacent similar standards in position supporting a trunnioned roller holding a rod and furnished with a tie-rod or spindle on which a sheave-roller is mounted. Fig. 3 is a mid-horizontal section on lines X Y and X' Y' of Fig. 1, showing a single separated standard constructed according to my invention. Fig. 4 shows in perspective a number of double-faced single or separated standards built up to form a frame for multiple rodding. Fig. 5 shows in perspective a simple construction of combined standards, that is to say, two uprights cast solid on one base. Fig. 6 shows the like construction fitted with a rod and roller.

The standards A A, Figs. 1, 2, and 3, are made for being fitted together as are those in Fig. 4. The lower roller B throughout the figures is the traveling trunnioned roller which supports the rod C. The upper non-traveling roller D D' may consist of two half-sheaves mounted on the tie-rod E, connecting the said separated standards A A. In the frame for multiple rodding, Fig. 4, the standards A A A A are in different stages of equipment, but they only differ from Fig. 1 in minor particulars, possessing twin or double tie-rods E E, and room for channel-iron rodding, if desired, in place of pipe rodding. The passage K from the crown to the bearing-course appears more plainly than in Fig. 1. The passage might have had an entry at one side and the rim of the crown preserved entire.

Throughout all the figures F F are the wall-like formations at the base parts H of the standards, which meet each other at Fig. 4 and furnish the pedestal fence guarding the roller from obstruction. In Figs. 5 and 6 the pedestal fences are continuous from standard to standard on each solid base.

The novel traveling course J, with a central dip or gentle incline from both ends toward the middle, can be seen in Figs. 1, 4, 5, and 6, in all of which it has much the same curved form. At Figs. 1 and 2 the roller B is shown in position, its trunnions being supported on the bearing-courses J J on the two inner faces of the two adjacent standards A A, and is illustrated at one end of its travel. The pit or clearance-channel G allows for easily removing foreign substances that may fall from the rollers or their trunnions. The channels K allow the roller-trunnions to pass down when the roller is inserted between the standards.

I claim—

1. In combination with the actuating-rod and the roller supporting the same and having projecting trunnions, guide-bearing frames between which the rod passes and the roller is received, such frames having surfaces that are inclined upwardly in both directions from the central portion, and on which surfaces the trunnions of the supporting-rollers rest, substantially as set forth.

2. The combination with the actuation-rod and the roller supporting the same and having projecting trunnions, of frames between which the rod and the roller are received, such frames having bases with open transverse clearance-channels below the roller and guard-fences upon the frames at each side of the clearance-channels, substantially as set forth.

3. The frames for the antifriction-roller supporting the actuating-rod, such frames being castings with curved surfaces J at the bottom of the recessed sides upon which the trunnions of the roller rest, and the passages K in the upper parts of the frames through which the trunnions are passed, substantially as set forth.

WILLIAM SMITH.

Witnesses:
G. HURLSTONE MARCH,
GEO. J. B. FRANKLIN.